US012338761B2

(12) United States Patent
Brignone et al.

(10) Patent No.: US 12,338,761 B2
(45) Date of Patent: Jun. 24, 2025

(54) HEATING DEVICE FOR AN EXHAUST SYSTEM OF AN INTERNAL COMBUSTION ENGINE

(71) Applicant: MARELLI EUROPE S.P.A., Corbetta (IT)

(72) Inventors: Mauro Brignone, Corbetta (IT); Salvatore Pizza, Corbetta (IT); Emanuele Milani, Corbetta (IT); Marco La Sana, Corbetta (IT); Francesco Napoli, Corbetta (IT); Luigi Lubrano, Corbetta (IT); Marco Bovina, Corbetta (IT)

(73) Assignee: MARELLI EUROPE S.P.A., Corbetta (IT)

( * ) Notice: Subject to any disclaimer, the term of this patent is extended or adjusted under 35 U.S.C. 154(b) by 5 days.

(21) Appl. No.: 18/517,913

(22) Filed: Nov. 22, 2023

(65) Prior Publication Data

US 2024/0175387 A1 May 30, 2024

(30) Foreign Application Priority Data

Nov. 24, 2022 (IT) ........................ 102022000024240

(51) Int. Cl.
*F01N 3/26* (2006.01)
*F01N 3/20* (2006.01)
*F01N 3/36* (2006.01)

(52) U.S. Cl.
CPC ............. *F01N 3/26* (2013.01); *F01N 3/2033* (2013.01); *F01N 3/36* (2013.01)

(58) Field of Classification Search
CPC .... F01N 2240/14; F01N 3/025; F01N 3/2033; F01N 2240/20; F01N 3/26;

(Continued)

(56) References Cited

U.S. PATENT DOCUMENTS 3,070,150 A * 12/1962 Hunter ................. F23D 11/105
431/263
3,245,457 A * 4/1966 Smith .................... F23Q 3/008
431/11

(Continued)

FOREIGN PATENT DOCUMENTS

DE          4209470 A1    4/1993
WO       2012106335 A2    8/2012

OTHER PUBLICATIONS

Search Report for Italian Patent Application No. 202200024240 dated May 24, 2023.

*Primary Examiner* — Anthony Ayala Delgado
(74) *Attorney, Agent, or Firm* — Howard & Howard Attorneys PLLC

(57) ABSTRACT

A heating device for an exhaust system of an internal combustion engine and having: a main tubular body, which contains a combustion chamber delimited by a first base wall and by a second base wall, which are opposite one another; a fuel injector configured to inject fuel; an inlet opening, which can be connected to a fan to receive an air flow, which is directed to the combustion chamber and gets mixed with fuel; a secondary tubular body which is arranged inside the main tubular body and inside the combustion chamber and has a side wall, which is arranged at a given distance from the side wall of the main tubular body so as to divide an initial part of the combustion chamber into a central zone, which is located inside the secondary tubular body, and an annular peripheral zone, which is located around the secondary tubular body.

24 Claims, 8 Drawing Sheets

(58) Field of Classification Search
CPC .............. F01N 2610/14; F01N 3/204; F01N 2610/1453; F23D 11/402; F23D 1/02
See application file for complete search history.

(56) References Cited

U.S. PATENT DOCUMENTS

| | | | | |
|---|---|---|---|---|
| 5,320,523 | A * | 6/1994 | Stark | F01N 3/2033 60/303 |
| 7,980,069 | B2 * | 7/2011 | Arellano | F23D 91/02 60/297 |
| 8,695,569 | B2 * | 4/2014 | Gaiser | F23D 91/02 123/502 |
| 11,898,482 | B2 * | 2/2024 | Di Vieste | F01N 3/2033 |
| 2011/0289906 | A1 * | 12/2011 | Morley | F23J 15/025 60/320 |

* cited by examiner

HEATING DEVICE FOR AN EXHAUST SYSTEM OF AN INTERNAL COMBUSTION ENGINE

CROSS-REFERENCE TO RELATED APPLICATIONS

This patent application claims priority from Italian patent application no. 102022000024240 filed on Nov. 24, 2022, the entire disclosure of which is incorporated herein by reference.

TECHNICAL FIELD

The present invention relates to a heating device for an exhaust system of an internal combustion engine.

PRIOR ART

An exhaust system of an internal combustion engine comprises an exhaust duct along which at least one treatment device is installed for treating the exhaust gases coming from the internal combustion engine; in particular, a (an oxidation or reduction) catalyst is always provided to which a particulate filter can be added. In order to function (i.e. in order to produce the catalytic conversion), the catalyst requires to operate at a relatively high operating temperature (a modern catalyst works at temperatures also near 800° C.) since the chemical reactions for converting unburned hydrocarbons, nitrogen oxides and carbon monoxide into carbon dioxide, water and nitrogen take place only once the working temperature has been reached.

During a cold starting step (i.e. when the internal combustion engine is started after a prolonged stop by effect of which the temperature of the various components of the internal combustion engine reaches the room temperature), the temperature of the catalyst remains much below the operating temperature for a relatively long time (also several minutes in winter and during a city route along which the internal combustion engine always or almost always runs at idle). Consequently, during the cold starting step, i.e. during the period of time in which the catalyst has not yet reached its operating temperature, the pollutant emissions at the outlet are high because the purification effect of the catalyst is null or anyway not very effective.

In order to quicken the reaching of the operating temperature of the catalyst, patent documents EP0631039A1, WO2012139801A1 and U.S. Pat. No. 8,006,487 B2 propose to install along the exhaust duct a heating device which, by burning fuel, generates a (very) hot air flow which flows through the catalyst. In particular, the heating device comprises a combustion chamber which is connected at the outlet to the exhaust duct (immediately upstream of the catalyst) and is connected at the inlet to a fan which generates an air flow which flows through the combustion chamber; in the combustion chamber, also a fuel injector, which injects fuel that gets mixed with air, and a spark plug, which cyclically gives off sparks for igniting the air-fuel mixture so as to obtain the combustion that heats the air, are arranged.

In the known heating devices, the combustion of fuel is not always complete in all operating conditions and it can thus occur (particularly when a high quantity of fuel is injected for developing a large quantity of heat) that unburned fuel arrives in the exhaust duct; when the unburned fuel arrives in the exhaust duct, it can burn inside the exhaust duct locally determining sudden, unexpected and undesired rises in temperature, or it can also not burn (for example, due to the lack of suitable triggering or to the lack of oxygen) inside the exhaust duct and thus be released into the environment increasing the quantity of pollutant emissions (in particular of unburned HC groups).

U.S. Pat. No. 3,070,150 A describes an air-atomizing burner in which both the combustion air and the liquid fuel oil are supplied to a nozzle; the combustion air is supplied under pressure for entraining the fuel through a common orifice in the form of fuel mixture.

Patent application WO2012106335A2 describes an exhaust gas treatment system for an internal combustion engine and comprising a regeneration device which receives the exhaust gases from the engine and is arranged upstream of a particulate filter. The regeneration device is coupled to an air/fuel nozzle which receives the supply of fuel and of compressed air coming from a compressor; the fuel and the compressed air are forced through an orifice of the nozzle for atomizing the fuel. A bypass line adjusted by a valve provides compressed air from the compressor to the regeneration device without flowing through the orifice of the nozzle.

Patent application DE4209470A1 describes a burner which is located in the exhaust system of an internal combustion engine for the regeneration of a particulate filter. The burner comprises a combustion chamber in which a fuel nozzle is arranged provided sideward of the nozzle of a side supply of the combustion air; the exhaust gases of the engine are conveyed into a mixing chamber upstream of the particulate filter for mixing with the combustion gases.

DESCRIPTION OF THE INVENTION

The object of the present invention is to provide a heating device for an exhaust system of an internal combustion engine, said heating device allowing obtaining in all operating conditions a complete and stable combustion of fuel (i.e. without leading unburned fuel into the exhaust duct and without exceedingly heating the exhaust duct), allowing obtaining high energy efficiency (i.e. a high conversion of the chemical energy of fuel into heat which is transmitted inside the exhaust system) and, furthermore, being easy and cost-effective to manufacture.

According to the present invention, a heating device for an exhaust system of an internal combustion engine is provided, according to what is claimed in the appended claims.

The claims describe preferred embodiments of the present invention forming integral part of the present description.

BRIEF DESCRIPTION OF THE DRAWINGS

The present invention will now be described with reference to the accompanying drawings, which illustrate a non-limiting example embodiment thereof, wherein.

PREFERRED EMBODIMENTS OF THE INVENTION

Figure 1:
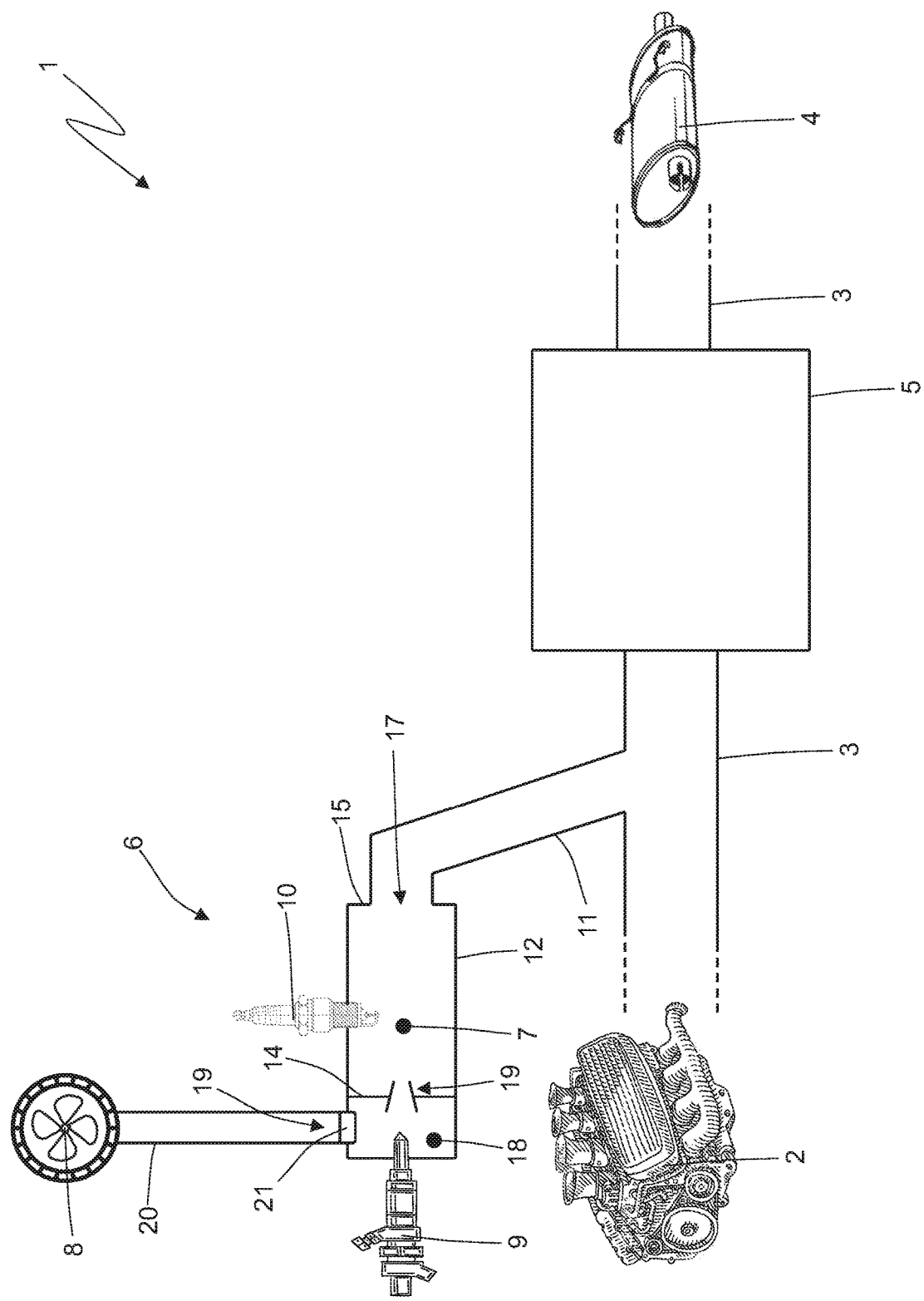
FIG. 1 is a partial schematic view of an exhaust system of an internal combustion engine provided with a heating device manufactured in accordance with the present invention.

In FIG. 1, reference numeral 1 indicates, as a whole, an exhaust system of an internal combustion engine 2.

The exhaust system 1 comprises an exhaust duct 3 which originates from an exhaust manifold of the internal combustion engine 2 and ends with a silencer 4 from which exhaust gases are released into the atmosphere. Along the exhaust duct 3 at least one exhaust gas treatment device 5 is installed coming from the internal combustion engine; in particular, a (an oxidation or reduction) catalyst is always provided to which a particulate filter can be added. In order to function (i.e. in order to produce the catalytic conversion), the catalyst requires to operate at a relatively high operating temperature (a modern catalyst works at temperatures also near 800° C.) since the chemical reactions for converting unburned hydrocarbons, nitrogen oxides and carbon monoxide into carbon dioxide, water and nitrogen take place only once the working temperature has been reached.

In order to quicken the heating of the treatment device 5, i.e. in order to allow the treatment device 5 to reach its operating temperature more quickly, the exhaust system 1 comprises a heating device 6 (burner) which by burning fuel generates a (very) hot air flow which flows through the treatment device 5.

The heating device 6 comprises a combustion chamber 7 which is connected at the outlet to the exhaust duct 3 (immediately upstream of the treatment device 5) and is connected at the inlet to a fan 8 (i.e. to an air pump) which generates an air flow which flows through the combustion chamber 7. A fuel injector 9 injects fuel which gets mixed with air, and a spark plug 10, arranged directly in the combustion chamber 7, cyclically gives off sparks for igniting the air-fuel mixture so as to obtain the combustion which heats the air. The combustion chamber 7 of the heating device 6 ends in an outlet duct 11 coming out of the exhaust duct 3 (immediately upstream of the treatment device 5).

Figure 2:
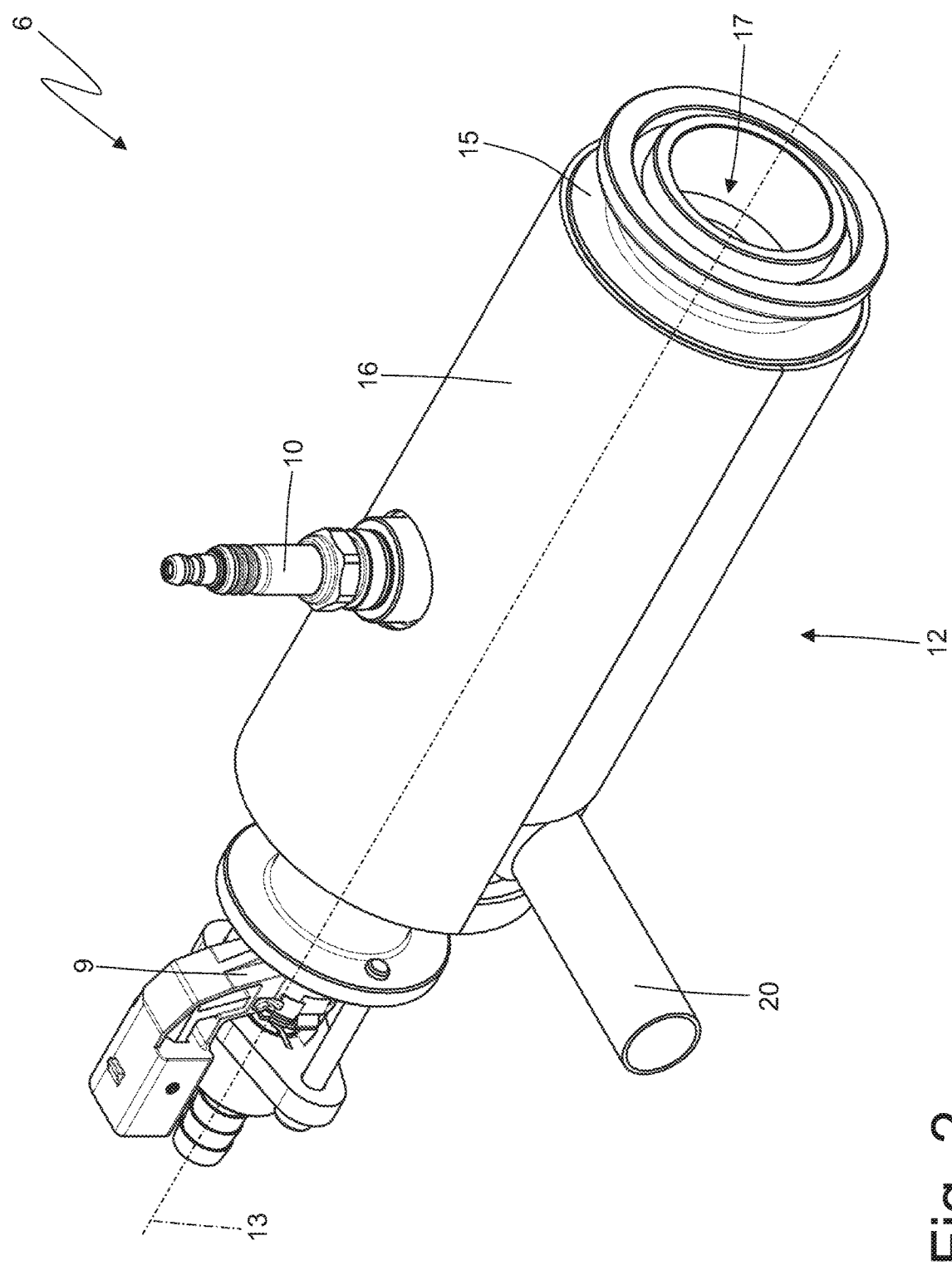
FIG. 2 is a perspective view of the heating device of FIG. 1.
Figure 3:
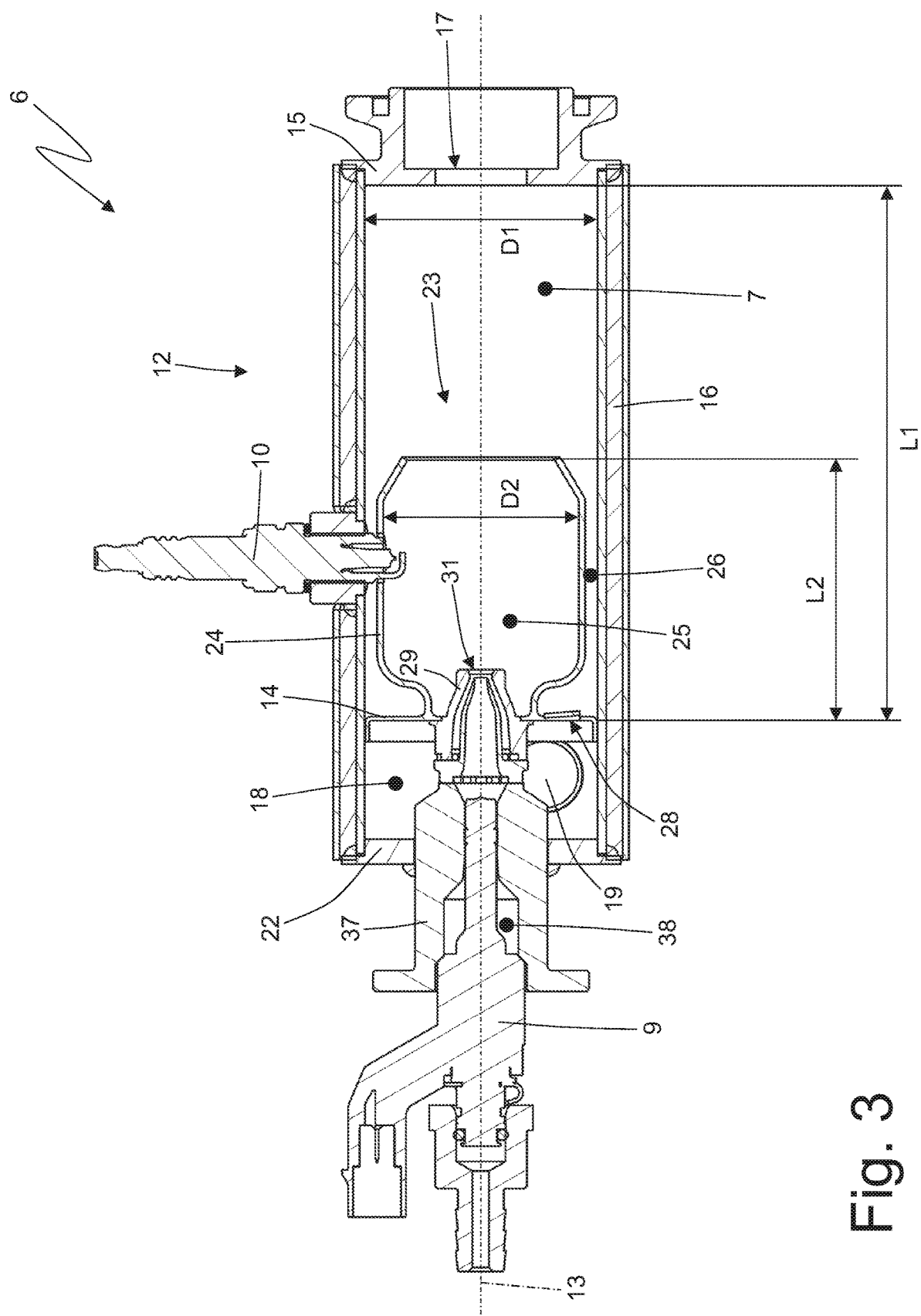
FIG. 3 is a longitudinal section view of the heating device of FIG. 1.

According to what is illustrated in FIGS. 2 and 3, the heating device 6 comprises a main tubular body 12 (for example, with a cylindrical shape and having a circular or elliptical cross-section) having a longitudinal axis 13; the combustion chamber 7 inside the main tubular body 12 is delimited at the two ends by two base walls 14 and 15 opposite one another and is laterally delimited by a side wall 16 which connects the two base walls 14 and 15 to one another.

The base wall 15 is centrally perforated for coming out of the outlet duct 11 which ends in the exhaust duct 3; namely, the base wall 15 has an outlet opening 17 of hot air from the combustion chamber 7 from which the outlet duct 11 originates.

According to what is illustrated in FIG. 3, a mixing chamber is provided which arranged beside the combustion chamber 7 and is separated from the combustion chamber 7 by the base wall 14; the mixing chamber 18 receives fuel from the fuel injector 9 (i.e. the fuel injector 9 injects fuel inside the mixing chamber 18) and receives air (which constitutes the comburent and has to get mixed with fuel) through an inlet opening 19 (illustrated in FIG. 1) which is connected to the fan 8 by means of an inlet duct 20 (illustrated in FIGS. 1 and 2). In other words, through the inlet opening 19, the mixing chamber 18 receives an air flow which subsequently flows into the combustion chamber 7.

Preferably, air enters the inlet opening 19 with a flow oriented tangentially (with respect to the mixing chamber 18), i.e. the inlet duct 20 is oriented tangentially (with respect to the mixing chamber 18), for causing a circular swirling motion around the longitudinal axis 13 of the air flow which enters the mixing chamber 18.

According to a possible (but not binding) embodiment illustrated in FIG. 1, at the inlet opening 19, a non-return valve 21 is arranged which allows an air flow only towards the combustion chamber 7 (i.e. entering the main tubular body 12). Preferably, the non-return valve 21 is passive (i.e. does not comprise electric, hydraulic or pneumatic actuators which generate a movement), is pressure-controlled, and opens only when a pressure upstream of the non-return valve 21 is greater than a pressure downstream of the non-return valve 21. The function of the non-return valve 21 is to prevent that when the heating device 6 is not utilized (therefore, when the fan 8 is turned off) exhaust gases can ascend exiting from the inlet opening 19 and thus disperse into the environment without flowing through the treatment device 5. Alternatively, the non-return valve 21 could be mounted along the outlet duct 11, for example at the outlet opening 17; in this case, the non-return valve 21 allows an air flow exiting only from the combustion chamber 7 (exiting from the main tubular body 12) towards the exhaust duct 3, i.e. prevents exhaust gas from flowing from the exhaust duct 3 towards the combustion chamber 7 (entering the main tubular body 12).

A base wall 22 is provided which faces and is opposite the base wall 14, is fixed to an end of the main tubular body 12, and axially delimits the mixing chamber 18 on the opposite side relative to the base wall 14; namely, the mixing chamber 18 is axially delimited on one side by the base wall 22 and on the opposite side by the base wall 14; whereas, the combustion chamber 7 is axially delimited on one side by the base wall 14 and on the opposite side by the base wall 15. The base walls 22 and 15 are arranged at the two opposite ends of the main tubular body 12, i.e. constitute two "plugs" (centrally perforated) of the main tubular body 12; whereas, the base wall 14 is arranged inside the main tubular body 12 between the base walls 22 and 15 and externally has a circular flange which is internally welded to the side wall 16 of the main tubular body 12.

According to what is illustrated in FIG. 3, a secondary tubular body 23 is provided which is arranged inside the main tubular body 12 and inside the combustion chamber 7, is directly connected to the base wall 14, and has a side wall 24 which is arranged at a given distance from the side wall 16 of the main tubular body 12 so as to divide an initial part of the combustion chamber 7 into a cylindrical central zone 25, which is located inside the secondary tubular body 23, and an annular peripheral zone 26, which is located around the secondary tubular body 23.

Namely, at the secondary tubular body 23, the space which is located inside the secondary tubular body 23 corresponds to the central zone 25, whereas the space which is located outside of the secondary tubular body 23 (around the secondary tubular body 23 and between the side wall 24 of the secondary tubular body 23 and the side wall 16 of the main tubular body 12) corresponds to the peripheral zone 26.

According to a preferred embodiment, the base wall 14 and the secondary tubular body 23 form one single indivisible unit in which the secondary tubular body 23 projects from the base wall 14. In other words, the secondary tubular body 23 is connected directly and in an inseparable manner to the base wall 14 from which it projects.

Figure 4:
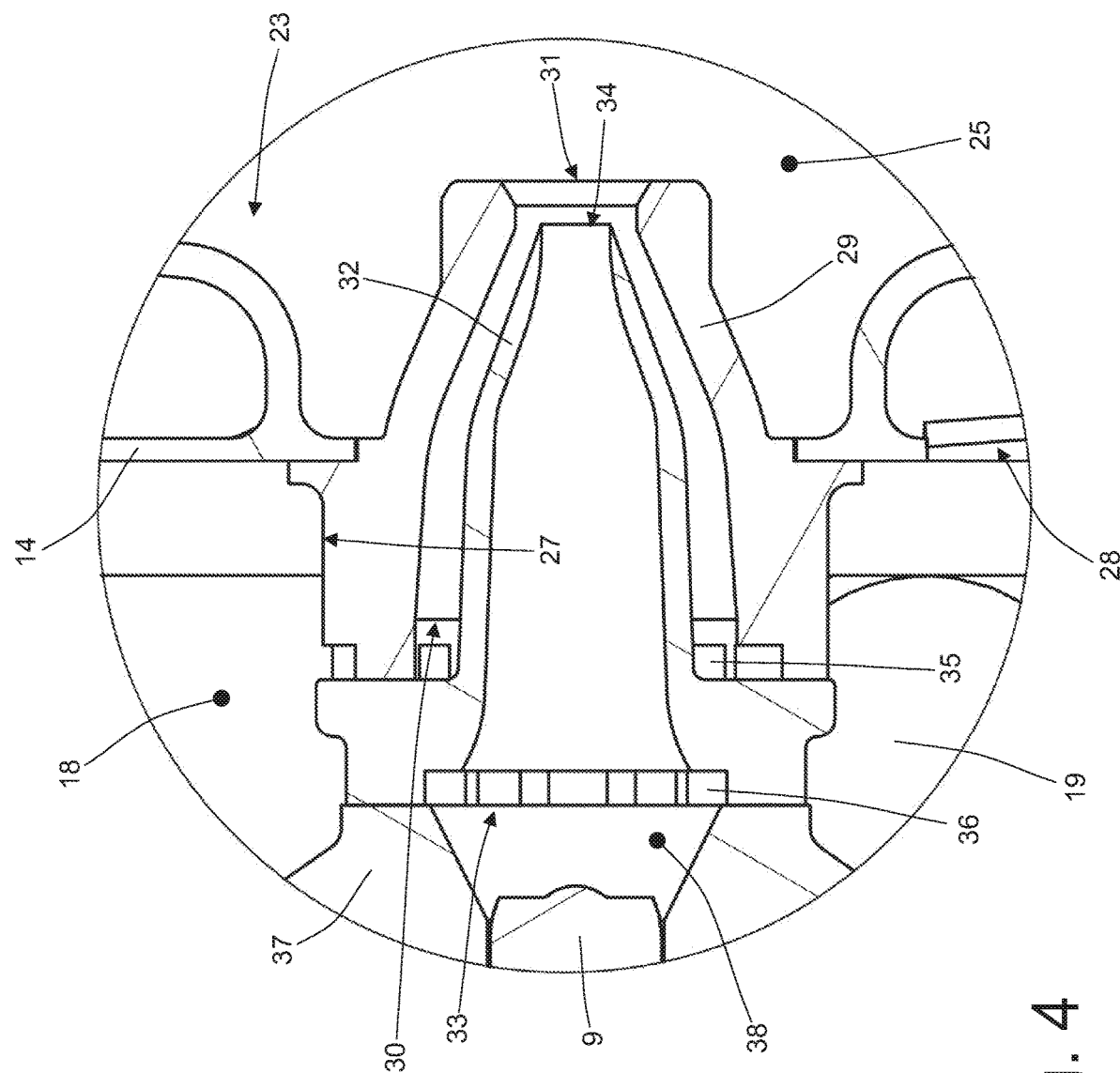
FIGS. 4 and 5 are two different views on an enlarged scale of respective details of FIG. 3.

According to what is better illustrated in FIG. 4, the base wall 14 has one single central passage opening 27 configured to lead the fuel sprayed by the fuel injector 9 and part of the air flow into the secondary tubular body 23 (i.e. into the central zone 25 of the combustion chamber 7); alternatively, according to a different embodiment not illustrated, the base wall 14 could have two or more central passage openings 27 configured to lead fuel. Furthermore, the base wall 14 has a plurality (three in the embodiment illustrated in the accompanying figures) of peripheral passage openings 28 configured to lead a remaining part of the air flow outside of (to the outside of) the secondary tubular body 23 (i.e. into the annular peripheral zone 26 of the combustion chamber 7 around the secondary tubular body 23); alternatively, according to a different embodiment not illustrated, the base wall 14 could have a different number of peripheral passage openings 28 (for example, only one peripheral passage opening 28 or two, four, five, six . . . peripheral passage openings 28).

According to a preferred embodiment, each peripheral passage opening 28 is shaped to cause a circular swirling motion around the longitudinal axis 13 of the remaining part of the air flow (i.e. of the part of the air flow which does not flow through the central passage opening 27).

According to what is illustrated in FIG. 4, a converging nozzle 29 goes through the base wall 14, said converging nozzle 29 engages the central passage opening 27 of the base wall 14, establishes a communication between the mixing chamber 18 and the central zone 25 of the combustion chamber 7 and is arranged partly inside the mixing chamber 18 and partly inside the central zone 25 of the combustion chamber 7 (i.e. inside the secondary tubular body 23); namely, the converging nozzle 29 has an (a larger) inlet opening 30 which is located in the mixing chamber 18 and an (a smaller) outlet opening 31 which is located in the central zone 25 of the combustion chamber 7 (i.e. inside the secondary tubular body 23).

Another converging nozzle 32 is provided which is coaxial to the converging nozzle 29 and is arranged inside the converging nozzle 29; namely, the two nozzles 29 and 32 are arranged inside one another.

According to a preferred embodiment illustrated in the accompanying figures, the converging nozzle 32 has an inlet opening 33 which is located in the mixing chamber 18 and is coaxial to and faces a spray tip of the fuel injector 9 from which fuel flows out; namely, the fuel injector 9 injects fuel directly through the inlet opening 33 into (i.e. directly inside) the converging nozzle 32. In particular, the fuel injector 9 is coaxial (i.e. aligned along the longitudinal axis 13) to the converging nozzle 32 (and thus also to the converging nozzle 29) and the spray tip of the fuel injector 9 from which the fuel flows out is located inside the mixing chamber 18.

According to a preferred embodiment illustrated in the accompanying figures, the converging nozzle 32 has an outlet opening 34 which is arranged inside the converging nozzle 29 at a distance other than zero from the outlet opening 31 of the converging nozzle 29.

According to a preferred embodiment not illustrated in the accompanying figures, the inlet opening 30 of the converging nozzle 29 receives only air and only from a series of through holes 35 which are radially made in a side wall of the converging nozzle 29. Preferably, the through holes 35 are oriented to cause a circular swirling motion of the air around the longitudinal axis 13.

According to a preferred embodiment illustrated in the accompanying figures, the inlet opening 33 of the converging nozzle 32 receives air only from a series of through holes 36 which are radially made in a side wall of the nozzle. Preferably, the through holes 36 are oriented to cause a swirling motion of the air around the longitudinal axis 13.

Summarizing, the fuel injected by the fuel injector 9 completely enters the converging nozzle 32; whereas, the air (i.e. the comburent) supplied by the inlet duct 20 into the mixing chamber 18 partly enters the converging nozzle 32 through the through holes 36 and partly enters the converging nozzle 29 through the through holes 35 (a remaining part of the air supplied by the inlet duct 20 into the mixing chamber 18 does not enter the converging nozzles 29 and 32 but flows out of the mixing chamber 18 through the peripheral passage openings 28 of the base wall 14). From the converging nozzles 29 and 32, fuel and air flow out directed to the central zone 25 of the combustion chamber 7 (i.e. inside the secondary tubular body 23).

According to a preferred embodiment, the fuel injector 9 is configured to cause a rotary motion of the injected fuel around the longitudinal axis 13; namely, the fuel injector 9 is of "swirl" type and confers to the injected fuel a swirling motion around the injection direction (i.e. around the longitudinal axis 13).

According to a preferred embodiment illustrated in FIG. 3, a tubular containing element 37 is provided which goes through the base wall 22 (i.e. which is arranged through the base wall 22) and houses, on the inside, an end part of the fuel injector 9. Namely, the fuel injector 9 is inserted inside the containing element 37 which is arranged through the base wall 22. In particular, the containing element 37 internally has a central channel 38 in which the fuel injector 9 is arranged; the central channel 38 ends with a diverging countersunk portion which is arranged downstream of the injection point of the fuel injector 9 (i.e. downstream of the spray tip of the fuel injector 9 from which flows out). According to a preferred embodiment fuel illustrated in FIGS. 3 and 4, the converging nozzle 32 rests against the containing element 37 and therefore the inlet opening 33 of the converging nozzle 32 is arranged at the end of the central channel 38 of the containing element 37; namely, a base wall of the converging nozzle 32 is in contact with a base wall of the containing element 37.

Figure 5:
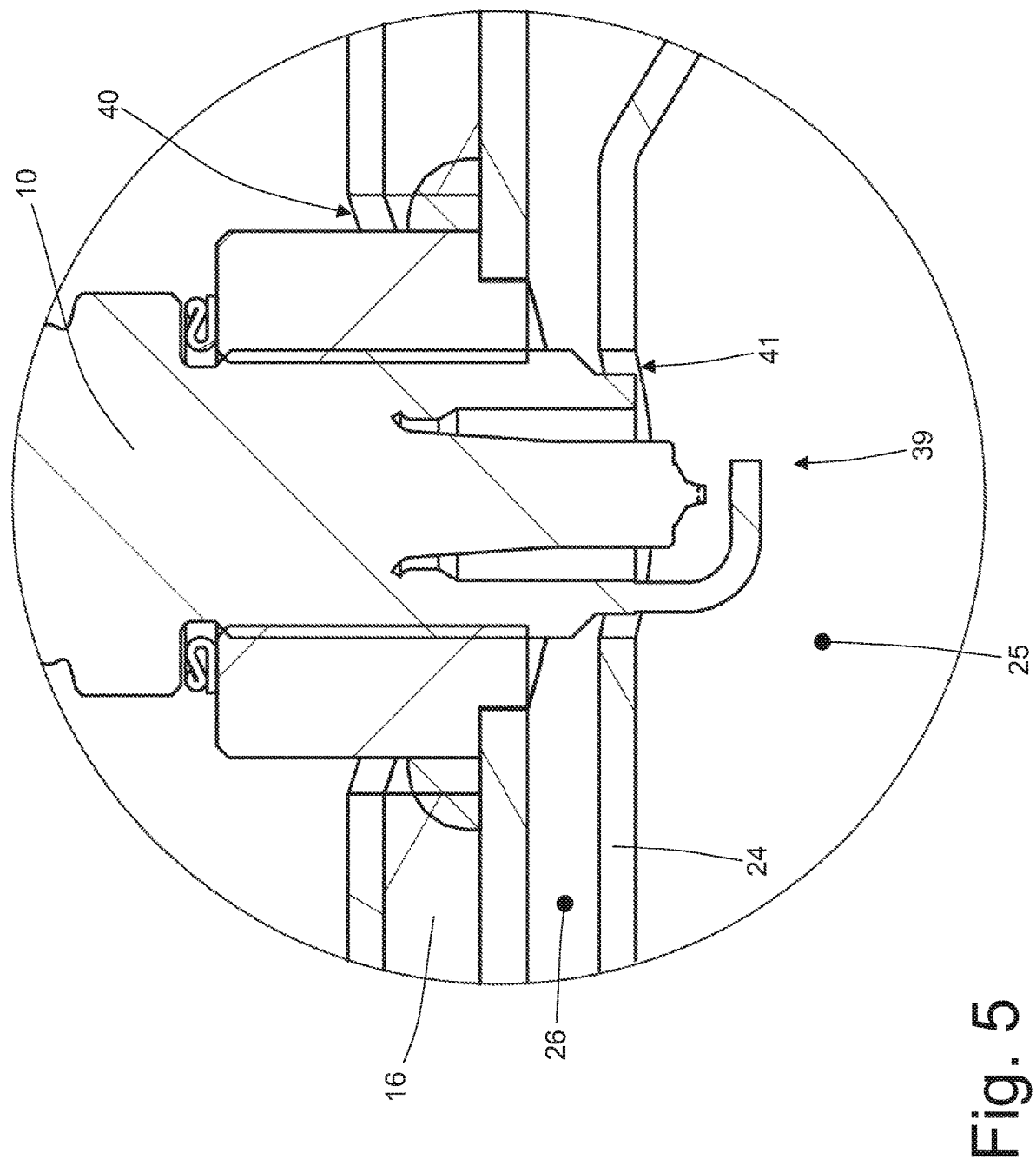
Figure 6:
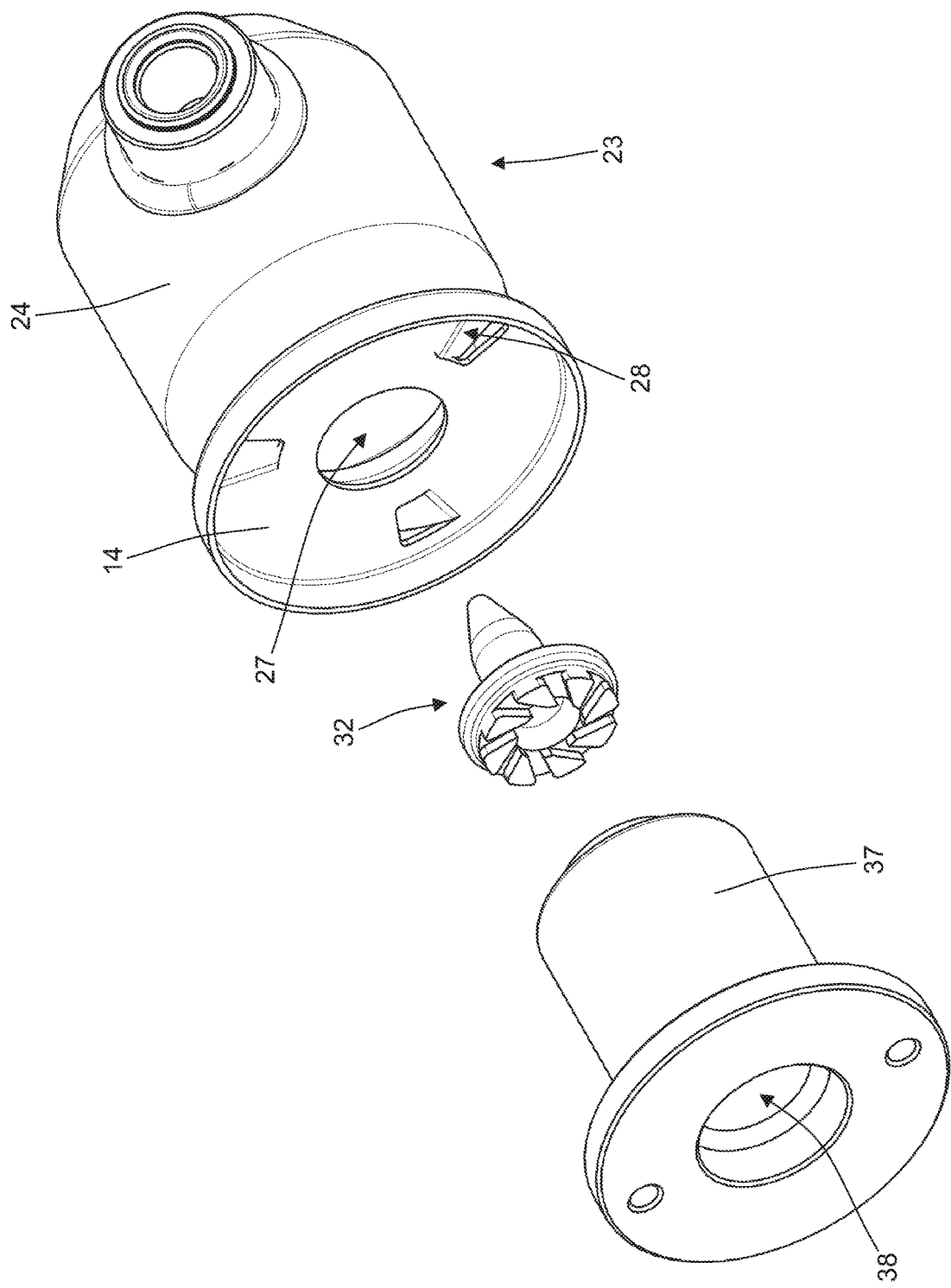
FIG. 6 is an exploded perspective view of an assembly of FIG. 3.
Figure 7:
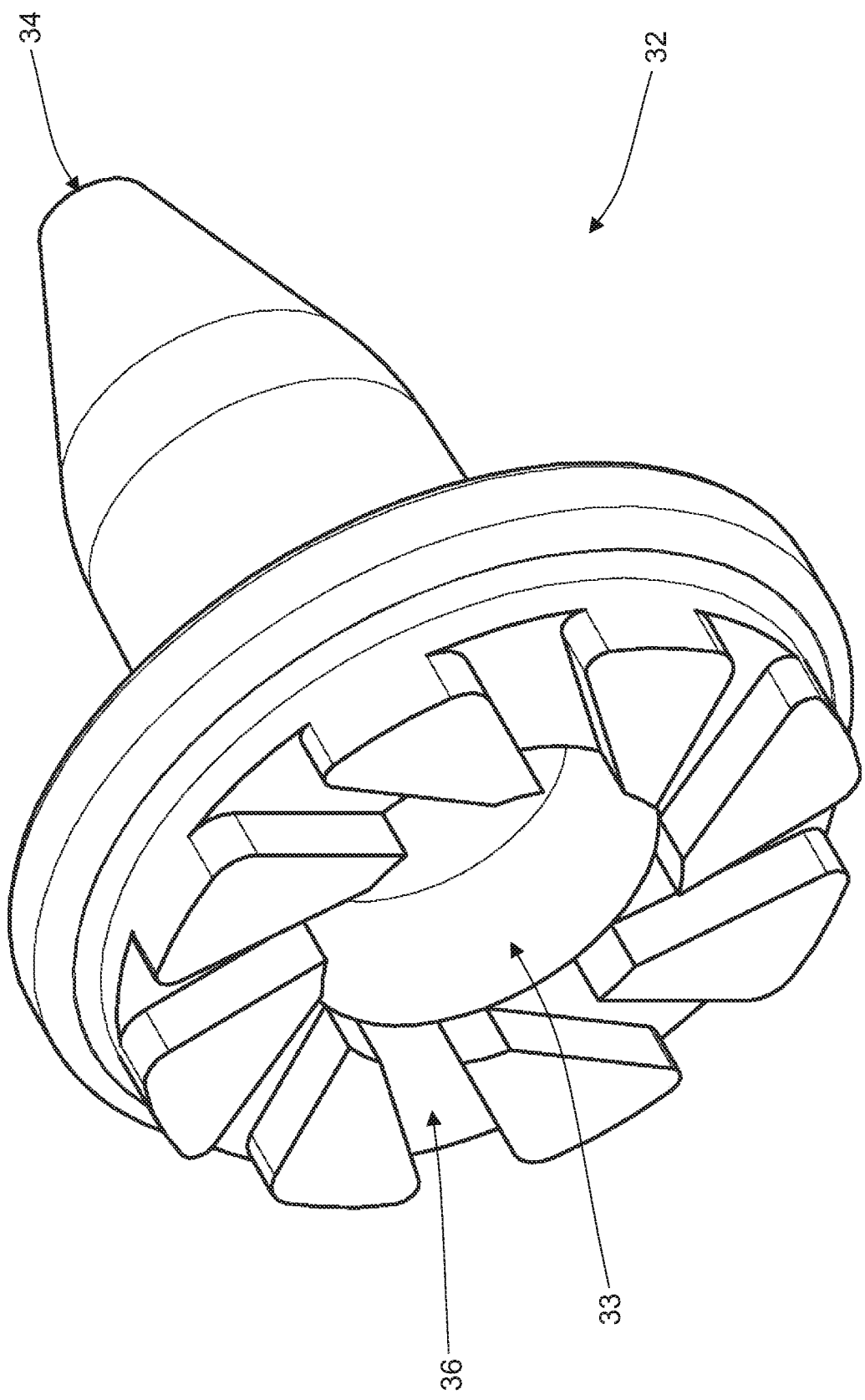
FIGS. 7 and 8 are perspective views of two components of the assembly of FIG. 6.
Figure 8:
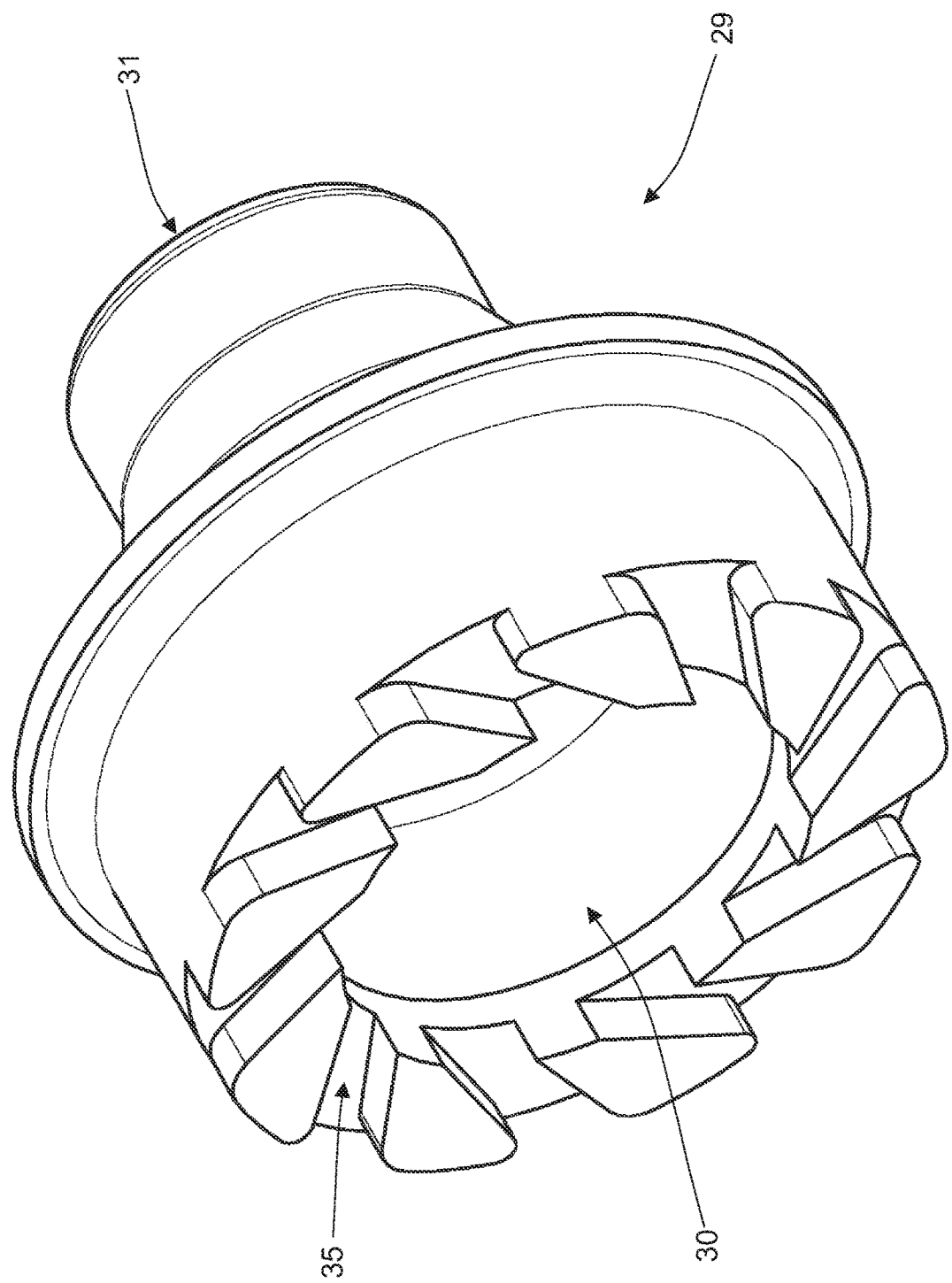

According to what is illustrated in FIG. 5, the spark plug 10 (provided with a pair of electrodes 39) is mounted through the side wall 16 of the main tubular body 12 and through the side wall 24 of the secondary tubular body 23 so that the electrodes 39 of the spark plug 10 are arranged in the central zone 25 of the combustion chamber 7 (i.e. inside the secondary tubular body 23) to trigger the combustion of a mixture of air and fuel which is generated due to the mixing of the air entering from the inlet opening 19 with the fuel injected by the fuel injector 9. In particular, the side wall 16 of the main tubular body 12 has a through hole 40 which is oriented radially (i.e. perpendicular to the longitudinal axis 13) and similarly the side wall 24 of the secondary tubular body 23 has a through hole 41 which is oriented radially and is coaxial to the through hole 40; the spark plug 10 is arranged through the two through holes 40 and 41 so as to arrange its electrodes 39 in the central zone 25 of the combustion chamber 7 (i.e. inside the secondary tubular body 23).

According to a preferred embodiment illustrated in FIG. 3, the secondary tubular body 23 ends, on the side opposite the base wall 14, with a converging conical conformation which allows centrally concentrating the flame which generates inside the secondary tubular body 23, i.e. allows concentrating the flame around the longitudinal axis 13.

According to a preferred embodiment illustrated in FIG. 3, the secondary tubular body 23 has an axial length L2 (i.e. measured parallel to the longitudinal axis 13) which ranges from 40% to 60% of an axial length L1 of the combustion chamber 7.

According to a preferred embodiment illustrated in FIG. 3, the secondary tubular body 23 has a maximum diameter D2 (measured perpendicular to the longitudinal axis 13) which ranges from 75% to 90% of a maximum diameter D1 of the combustion chamber 7.

According to a preferred embodiment, the peripheral passage openings 28 of the base wall 14 are sized so that the air flow rate flowing through the peripheral passage openings 28 is higher (greater) than the air flow rate flowing through the central passage opening 27 (i.e. flowing through the two converging nozzles 29 and 32). In particular, the air flow rate flowing through the peripheral passage openings 28 ranges from 1.7 to 2.8 times the air flow rate flowing through the central passage opening 27.

The embodiments described herein can be combined with one another without departing from the scope of protection of the present invention.

The above-described heating device 6 has numerous advantages.

Firstly, the above-described heating device 6 allows obtaining in all operating conditions (particularly when injecting a high quantity of fuel for developing a large quantity of heat) a complete combustion of fuel (i.e. without leading unburned fuel into the exhaust duct 3) thanks to an optimal mixing of the comburent air with the fuel injected by the fuel injector 9. This result is obtained also thanks to the fact that the combustion begins in conditions of (relatively) fattier mixture in the central zone 25 of the combustion chamber 7 (i.e. inside the secondary tubular body 23) and is completed outside of the secondary tubular body 23 when the air flowing into the peripheral zone 26 of the combustion chamber 7 (i.e. outside of the secondary tubular body 23 and around the secondary tubular body 23) arrives in the combustion.

The fact that the combustion begins in conditions of (relatively) fattier mixture in the central zone 25 of the combustion chamber 7 (i.e. inside the secondary tubular body 23) allows easily obtaining the ignition of the flame when the heating device 6 is ignited and is at room temperature.

Furthermore, the above-described heating device 6 has high energy efficiency, since a very high fraction of the chemical energy of the heated fuel is converted into heat which is transmitted inside the exhaust system, whereas the dispersed heat (i.e. which is not transmitted inside the exhaust system) is definitely reduced. This result is obtained thanks to the presence of the secondary tubular body 23 around which a tubular cushion of fresh air is created; in fact, the fresh air coming from the peripheral passage openings 28 of the base wall 14 flows through the peripheral zone 26 of the combustion chamber 7 around the secondary tubular body 23. In this manner, the side wall 16 of the main tubular body 12 remains relatively cold preventing the emission of heat towards the outside through the side wall 16 and thus concentrating the heat towards the exhaust system. For the same reason, also the side wall 24 of the secondary tubular body 23 remains relatively cold thanks to the continuous cooling caused by the fresh air which flows around the side wall 24 of the secondary tubular body 23; indicatively, the temperature of the flame inside the secondary tubular body 23 is in the order of 1,000° C. whereas, also following a prolonged operation, the temperature of the side wall 24 of the tubular body 23 is in the order of 400-500° C.

The fact that both the side wall 16 of the main tubular body 12, and the side wall 24 of the secondary tubular body 23 remain relatively cold (also after a prolonged operation of the heating device 6) makes the above-described heating device 6 particularly suitable for a continuative operation (i.e. which prolongs for several minutes and also for several dozens of minutes) since the thermal stress of the components of the heating device 6 is anyway limited and thus bearable also during the continuative operation.

The above-described heating device 6 has high thermal power in relation to its overall dimensions; i.e. despite being relatively small, the above-described heating device 6 allows generating high thermal power.

Finally, the above-described heating device 6 is simple and cost-effective to manufacture, since it is composed of few parts which have a non-complex shape and are easy to join with standard welding and assembling operations.

LIST OF THE REFERENCE NUMERALS OF THE FIGS.

1 exhaust system
2 internal combustion engine
3 exhaust duct
4 silencer
5 treatment device
6 heating device
7 combustion chamber
8 fan
9 fuel injector
10 spark plug
11 outlet duct
12 main tubular body
13 longitudinal axis
14 base wall
15 base wall
16 side wall
17 outlet opening
18 mixing chamber
19 inlet opening
20 inlet duct
21 non-return valve
22 base wall
23 secondary tubular body
24 side wall
25 central zone
26 peripheral zone
27 central passage opening
28 peripheral passage opening
29 converging nozzle
30 inlet opening
31 outlet opening
32 converging nozzle
33 inlet opening
34 outlet opening
35 through holes
36 through holes
37 containing element
38 central channel
39 electrodes
40 through hole
41 through hole
D1 diameter D2 diameter
L1 length
L2 length

The invention claimed is:

1. A heating device (6) for an exhaust system (1) of an internal combustion engine (2); the heating device (6) comprises:
- a main tubular body (12), which contains a combustion chamber (7) delimited by a first base wall (14) and by a second base wall (15), which are opposite one another;
- a fuel injector (9) configured to inject fuel;
- one single inlet opening (19), which can be connected to a fan (8) to receive an air flow, which is directed to the combustion chamber (7) and gets mixed with fuel;
- a spark plug (10), which is mounted through a side wall (16) of the main tubular body (12) to trigger the combustion of a mixture of air and fuel; and
- a mixing chamber (18), which is arranged beside the combustion chamber (7), is separated from the combustion chamber (7) by the first base wall (14), receives air from the inlet opening (19) and receives fuel from the fuel injector (9);
- wherein the mixing chamber (18) receives air directly from the inlet opening (19), which leads into the mixing chamber (18);
- wherein a secondary tubular body (23) is provided, which is arranged inside the main tubular body (12) and inside the combustion chamber (7), is directly connected to the first base wall (14) and has a side wall (24), which is arranged at a given distance from the side wall (16) of the main tubular body (12) so as to divide an initial part of the combustion chamber (7) into a central zone (25), which is located inside the secondary tubular body (23), and an annular peripheral zone (26), which is located around the secondary tubular body (23);
- wherein the first base wall (14) has at least one central passage opening (27) configured to lead fuel and part of the air flow into the secondary tubular body (23) in the central zone (25) of the combustion chamber (7) and has at least one peripheral passage opening (28) configured to lead a remaining part of the air flow to the outside of the secondary tubular body (23) in the annular peripheral zone (26) of the combustion chamber (7);
- wherein a first converging nozzle (29) is provided which engages the central passage opening (27) of the first base wall (14), establishes a communication between the mixing chamber (18) and the central zone (25) of the combustion chamber (7) and is arranged partly inside the mixing chamber (18) and partly inside the central zone (25) of the combustion chamber (7); and
- wherein a second converging nozzle (32) is provided which is coaxial to the first converging nozzle (29) and is arranged inside the first converging nozzle (29);
- wherein an inlet opening (30) of the first converging nozzle (29) receives only air and only from a series of first through holes (35), which are radially made in a side wall of the first converging nozzle (29) and are oriented to cause a swirling motion of the air.

2. The heating device (6) according to claim 1, wherein the peripheral passage opening (28) is shaped to cause a circular swirling motion of the remaining part of the air flow.

3. The heating device (6) according to claim 1, wherein the second converging nozzle (32) has an outlet opening (34), which is arranged inside the first converging nozzle (29) at a distance other than zero from an outlet opening (31) of the first converging nozzle (29).

4. The heating device (6) according to claim 1, wherein:
- the second converging nozzle (32) has an inlet opening (33), which is coaxial to and faces a spray tip of the fuel injector (9), from which fuel flows out; and
- the inlet opening (33) of the second converging nozzle (32) receives air only from a series of second through holes (36), which are radially made in a side wall of the second converging nozzle (32) and are oriented to cause a swirling motion of the air.

5. The heating device (6) according to claim 1 and comprising a tubular containing element (37), which goes through a third base wall (22) facing and opposite the first base wall (14) and houses, on the inside, an end part of the fuel injector (9).

6. The heating device (6) according to claim 5, wherein the second converging nozzle (32) rests against the containing element (37).

7. The heating device (6) according to claim 1, wherein the fuel injector (9) is configured to cause a rotary motion of the injected fuel.

8. The heating device (6) according to claim 1, wherein the mixing chamber (18) is laterally delimited by the side wall (16) of the main tubular body (12) and the first base wall (14) is arranged inside the main tubular body (12) and is fixed to the side wall (16) of the main tubular body (12).

9. The heating device (6) according to claim 1 and comprising a third base wall (22), which faces and is opposite the first base wall (14), is fixed to an end of the main tubular body (12) and axially delimits the mixing chamber (18) on the opposite side relative to the first base wall (14).

10. The heating device (6) according to claim 1, wherein:
- the electrodes (39) of the spark plug (10) are arranged inside the secondary tubular body (23) in the central zone (25) of the combustion chamber (7); and
- the side wall (16) of the main tubular body (12) has a first through hole (40), through which the spark plug (10) is arranged, and the side wall (24) of the secondary tubular body (23) has a second through hole (41) coaxial to the first through hole and through which the spark plug (10) is arranged.

11. The heating device (6) according to claim 1, wherein:
- the secondary tubular body (23) has an axial length (L2), which ranges from 40% to 60% of an axial length (L1) of the combustion chamber (7); and
- the secondary tubular body (23) has a maximum diameter (D2), which ranges from 75% to 90% of a maximum diameter (D1) of the combustion chamber (7).

12. The heating device (6) according to claim 1, wherein the peripheral passage opening (28) of the first base wall (14) is sized so that the air flow rate flowing through the peripheral passage opening (28) is greater than the air flow rate flowing through the central passage opening (27).

13. The heating device (6) according to claim 12, wherein the air flow rate flowing through the peripheral passage opening (28) ranges from 1.7 to 2.8 times the air flow rate flowing through the central passage opening (27).

14. An exhaust system (1) of an internal combustion engine (2); the exhaust system (1) comprises:
- an exhaust duct (3), which originates from an exhaust manifold of the internal combustion engine (2) and ends with a silencer (4), from which exhaust gases are released into the atmosphere;

an exhaust gas treatment device (5), which is arranged along the exhaust duct (3); and a heating device (6) according to claim 1, which is connected to the exhaust duct (3) upstream of the treatment device (5) by means of an outlet duct (11) coming out of the exhaust duct (3), and is designed to generate, by burning fuel, a hot air flow.

15. A heating device (6) for an exhaust system (1) of an internal combustion engine (2); the heating device (6) comprises:

a main tubular body (12), which contains a combustion chamber (7) delimited by a first base wall (14) and by a second base wall (15), which are opposite one another;

a fuel injector (9) configured to inject fuel;

one single inlet opening (19), which can be connected to a fan (8) to receive an air flow, which is directed to the combustion chamber (7) and gets mixed with fuel;

a spark plug (10), which is mounted through a side wall (16) of the main tubular body (12) to trigger the combustion of a mixture of air and fuel; and a mixing chamber (18), which is arranged beside the combustion chamber (7), is separated from the combustion chamber (7) by the first base wall (14), receives air from the inlet opening (19) and receives fuel from the fuel injector (9);

wherein the mixing chamber (18) receives air directly from the inlet opening (19), which leads into the mixing chamber (18);

wherein a secondary tubular body (23) is provided, which is arranged inside the main tubular body (12) and inside the combustion chamber (7), is directly connected to the first base wall (14) and has a side wall (24), which is arranged at a given distance from the side wall (16) of the main tubular body (12) so as to divide an initial part of the combustion chamber (7) into a central zone (25), which is located inside the secondary tubular body (23), and an annular peripheral zone (26), which is located around the secondary tubular body (23);

wherein the first base wall (14) has at least one central passage opening (27) configured to lead fuel and part of the air flow into the secondary tubular body (23) in the central zone (25) of the combustion chamber (7) and has at least one peripheral passage opening (28) configured to lead a remaining part of the air flow to the outside of the secondary tubular body (23) in the annular peripheral zone (26) of the combustion chamber (7);

wherein is it provided a first converging nozzle (29), which engages the central passage opening (27) of the first base wall (14), establishes a communication between the mixing chamber (18) and the central zone (25) of the combustion chamber (7) and is arranged partly inside the mixing chamber (18) and partly inside the central zone (25) of the combustion chamber (7); and wherein a second converging nozzle (32) is provided which is coaxial to the first converging nozzle (29) and is arranged inside the first converging nozzle (29);

wherein a tubular containing element (37) is provided which goes through a third base wall (22) facing and opposite the first base wall (14) and houses, on the inside, an end part of the fuel injector (9).

16. The heating device (6) according to claim 15, wherein the second converging nozzle (32) rests against the containing element (37).

17. The heating device (6) according to claim 15, wherein the peripheral passage opening (28) is shaped to cause a circular swirling motion of the remaining part of the air flow.

18. The heating device (6) according to claim 15, wherein the second converging nozzle (32) has an outlet opening (34), which is arranged inside the first converging nozzle (29) at a distance other than zero from an outlet opening (31) of the first converging nozzle (29).

19. The heating device (6) according to claim 15, wherein:

the second converging nozzle (32) has an inlet opening (33), which is coaxial to and faces a spray tip of the fuel injector (9), from which fuel flows out; and the inlet opening (33) of the second converging nozzle (32) receives air only from a series of second through holes (36), which are radially made in a side wall of the second converging nozzle (32) and are oriented to cause a swirling motion of the air.

20. The heating device (6) according to claim 15, wherein an inlet opening (30) of the first converging nozzle (29) receives only air and only from a series of first through holes (35), which are radially made in a side wall of the first converging nozzle (29) and are oriented to cause a swirling motion of the air.

21. A heating device (6) for an exhaust system (1) of an internal combustion engine (2); the heating device (6) comprises:

a main tubular body (12), which contains a combustion chamber (7) delimited by a first base wall (14) and by a second base wall (15), which are opposite one another;

a fuel injector (9) configured to inject fuel;

one single inlet opening (19), which can be connected to a fan (8) to receive an air flow, which is directed to the combustion chamber (7) and gets mixed with fuel;

a spark plug (10), which is mounted through a side wall (16) of the main tubular body (12) to trigger the combustion of a mixture of air and fuel; and a mixing chamber (18), which is arranged beside the combustion chamber (7), is separated from the combustion chamber (7) by the first base wall (14), receives air from the inlet opening (19) and receives fuel from the fuel injector (9);

wherein the mixing chamber (18) receives air directly from the inlet opening (19), which leads into the mixing chamber (18);

wherein a secondary tubular body (23) is arranged inside the main tubular body (12) and inside the combustion chamber (7), is directly connected to the first base wall (14) and has a side wall (24), which is arranged at a given distance from the side wall (16) of the main tubular body (12) so as to divide an initial part of the combustion chamber (7) into a central zone (25), which is located inside the secondary tubular body (23), and an annular peripheral zone (26), which is located around the secondary tubular body (23);

wherein the first base wall (14) has at least one central passage opening (27) configured to lead fuel and part of the air flow into the secondary tubular body (23) in the central zone (25) of the combustion chamber (7) and has at least one peripheral passage opening (28) configured to lead a remaining part of the air flow to the outside of the secondary tubular body (23) in the annular peripheral zone (26) of the combustion chamber (7);

wherein a third base wall (22) is provided which faces and is opposite the first base wall (14), is fixed to an end of the main tubular body (12) and axially delimits the mixing chamber (18) on the opposite side relative to the first base wall (14).

22. A heating device (6) for an exhaust system (1) of an internal combustion engine (2); the heating device (6) comprises:
- a main tubular body (12), which contains a combustion chamber (7) delimited by a first base wall (14) and by a second base wall (15), which are opposite one another;
- a fuel injector (9) configured to inject fuel;
- one single inlet opening (19), which can be connected to a fan (8) to receive an air flow, which is directed to the combustion chamber (7) and gets mixed with fuel;
- a spark plug (10), which is mounted through a side wall (16) of the main tubular body (12) to trigger the combustion of a mixture of air and fuel; and
- a mixing chamber (18), which is arranged beside the combustion chamber (7), is separated from the combustion chamber (7) by the first base wall (14), receives air from the inlet opening (19) and receives fuel from the fuel injector (9);
- wherein the mixing chamber (18) receives air directly from the inlet opening (19), which leads into the mixing chamber (18);
- wherein a secondary tubular body (23) is arranged inside the main tubular body (12) and inside the combustion chamber (7), is directly connected to the first base wall (14) and has a side wall (24), which is arranged at a given distance from the side wall (16) of the main tubular body (12) so as to divide an initial part of the combustion chamber (7) into a central zone (25), which is located inside the secondary tubular body (23), and an annular peripheral zone (26), which is located around the secondary tubular body (23);
- wherein the first base wall (14) has at least one central passage opening (27) configured to lead fuel and part of the air flow into the secondary tubular body (23) in the central zone (25) of the combustion chamber (7) and has at least one peripheral passage opening (28) configured to lead a remaining part of the air flow to the outside of the secondary tubular body (23) in the annular peripheral zone (26) of the combustion chamber (7);
- wherein the secondary tubular body (23) has an axial length (L2), which ranges from 40% to 60% of an axial length (L1) of the combustion chamber (7); and
- wherein the secondary tubular body (23) has a maximum diameter (D2), which ranges from 75% to 90% of a maximum diameter (D1) of the combustion chamber (7).

23. A heating device (6) for an exhaust system (1) of an internal combustion engine (2); the heating device (6) comprises:
- a main tubular body (12), which contains a combustion chamber (7) delimited by a first base wall (14) and by a second base wall (15), which are opposite one another;
- a fuel injector (9) configured to inject fuel;
- one single inlet opening (19), which can be connected to a fan (8) to receive an air flow, which is directed to the combustion chamber (7) and gets mixed with fuel;
- a spark plug (10), which is mounted through a side wall (16) of the main tubular body (12) to trigger the combustion of a mixture of air and fuel; and
- a mixing chamber (18), which is arranged beside the combustion chamber (7), is separated from the combustion chamber (7) by the first base wall (14), receives air from the inlet opening (19) and receives fuel from the fuel injector (9);
- wherein the mixing chamber (18) receives air directly from the inlet opening (19), which leads into the mixing chamber (18);
- wherein a secondary tubular body (23) is arranged inside the main tubular body (12) and inside the combustion chamber (7), is directly connected to the first base wall (14) and has a side wall (24), which is arranged at a given distance from the side wall (16) of the main tubular body (12) so as to divide an initial part of the combustion chamber (7) into a central zone (25), which is located inside the secondary tubular body (23), and an annular peripheral zone (26), which is located around the secondary tubular body (23);
- wherein the first base wall (14) has at least one central passage opening (27) configured to lead fuel and part of the air flow into the secondary tubular body (23) in the central zone (25) of the combustion chamber (7) and has at least one peripheral passage opening (28) configured to lead a remaining part of the air flow to the outside of the secondary tubular body (23) in the annular peripheral zone (26) of the combustion chamber (7);
- wherein the peripheral passage opening (28) of the first base wall (14) is sized so that the air flow rate flowing through the peripheral passage opening (28) is greater than the air flow rate flowing through the central passage opening (27).

24. The heating device (6) according to claim 23, wherein the air flow rate flowing through the peripheral passage opening (28) ranges from 1.7 to 2.8 times the air flow rate flowing through the central passage opening (27).

* * * * *